United States Patent [19]

Mann et al.

[11] Patent Number: 5,610,819

[45] Date of Patent: Mar. 11, 1997

[54] SYSTEM FOR ENHANCING WHEEL TRACTION IN A LOCOMOTIVE BY REAPPLICATION OF EXCITATION USING AN S-SHAPED CURVE

[75] Inventors: Scott K. Mann, Johnson Creek, Wis.; David L. Durlin, Boise, Id.

[73] Assignee: G&G Locotronics, Inc., Itasca, Ill.

[21] Appl. No.: 322,014

[22] Filed: Oct. 11, 1994

[51] Int. Cl.$^6$ ............................. B61C 15/08; H02P 5/50
[52] U.S. Cl. ........................ 364/426.05; 318/52; 318/66; 318/71; 180/197
[58] Field of Search ........................ 364/426.05, 426.03; 318/52, 66, 69, 71, 376; 180/197; 105/34.2, 35

[56] References Cited

U.S. PATENT DOCUMENTS

| | | | |
|---|---|---|---|
| 3,790,871 | 2/1974 | Smith | 318/52 |
| 3,898,937 | 8/1975 | Johnson | 318/52 |
| 3,997,822 | 12/1976 | Logston, Jr. et al. | 318/71 |
| 4,095,147 | 6/1978 | Mountz | 105/35 |
| 4,392,091 | 7/1983 | Roberts et al. | 318/52 |
| 4,463,289 | 7/1984 | Young | 318/52 |
| 4,701,682 | 10/1987 | Hirotsu et al. | 180/197 |
| 4,936,610 | 6/1990 | Kumar et al. | 361/238 |
| 4,950,964 | 8/1990 | Evans | 318/66 |
| 5,436,538 | 7/1995 | Garvey et al. | 318/52 |

*Primary Examiner*—Kevin J. Teska
*Assistant Examiner*—Tan Nguyen
*Attorney, Agent, or Firm*—Welsh & Katz, Ltd.

[57] ABSTRACT

A traction enhancing system detects and corrects wheel slip and enhances wheel traction in a railroad locomotive having a plurality of wheel pairs for engaging a pair of rails and a traction motor operatively associated with each wheel pair. The locomotive includes an electrical source responsive to an applied level of excitation and is operatively coupled to the traction motors for controlling the power applied thereto. The traction enhancing system includes a plurality of current measuring devices adapted to measure current drawn by each traction motor, and a plurality of voltage measuring devices adapted to measure a voltage of each traction motor. A computer receives the current and voltage measurements and is configured to detect wheel slip between the wheel pairs and the rails by calculating a change in the current and voltage measured over a predetermined period of time. The change in current and voltage over time is compared to predetermined values and a reduction factor representative of the severity of the wheel slip is determined. The computer then reduces the level of excitation to the electrical source by an amount proportional to the reduction factor to eliminate the wheel slip. Power is then reapplied to the electrical source according to an S-shaped curve so that wheel slip does not reoccur.

6 Claims, 10 Drawing Sheets

SYSTEM FOR ENHANCING WHEEL TRACTION IN A LOCOMOTIVE BY REAPPLICATION OF EXCITATION USING AN S-SHAPED CURVE

The portion of the disclosure of this patent document contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to systems for controlling locomotive wheel slip, and more particularly to a novel system for detecting and controlling wheel slip in a locomotive having a plurality of direct current (DC) electric traction motors powered by an alternating current (AC) generator wherein reapplication of power after wheel slip detection and correction minimizes further wheel slip. Traction is maximized by applying power such that a controlled and sustained wheel creep is maintained.

Conventional railroad locomotives employ pairs of drive wheels fixed on transverse axles, each of which is rotatably powered by a direct current (DC) traction motor through a gearing arrangement. The traction motors are energized by an alternator or AC generator driven by a diesel engine. The alternator converts mechanical energy into electrical power which is used to operate the traction motors.

Typical locomotives have either four or six axles, with a corresponding number of traction motors which are arranged in a series-parallel or parallel configuration. In a six axle locomotive, the series-parallel configuration utilizes three sets of two traction motors with each set connected in series while remaining in parallel with the other sets. In the parallel configuration, all traction motors are arranged in parallel.

A problem encountered by virtually all rail locomotives is that the drive wheels on one or more of the axles may slip relative to the rails under various conditions. Wheel slip usually occurs during acceleration and deceleration of the locomotive, or when the locomotive is pulling a heavy load. Wheel slip commonly has three forms. The first form, referred to as differential wheel slip, occurs when at least one pair or set of drive wheels maintains tractive contact with the rails while at least one other pair or set of wheels slip. The second form of wheel slip is termed synchronous slip and occurs when all of the locomotive drive wheels slip simultaneously. The third form of wheel slip is termed one-truck synchronous slip and occurs when all of the wheels of one truck slip simultaneously. Prolonged and continued wheel slip generally results in significantly reduced wheel life, as well as severe rail wear, thereby leading to reduced fuel economy and substantially increased operating costs. Further, prolonged wheel slip may cause catastrophic motor failure due to motor overspeed conditions.

Numerous attempts have been made to either reduce or eliminate locomotive wheel slip. Known wheel slip control systems typically compare speed signals from the locomotive drive wheels with a speed signal from an idler wheel engaging one of the rails, or receive speed indications from the drive wheels or axles. Generally, the highest and lowest speed indications from the traction motors or wheels are compared. A slip condition is presumed to exist if the speed indications between the wheels differ by more than a predetermined amount. Many prior art systems use speed transducers such as radar based devices, axle generators, tachogenerators, or traction motor probes to produce the required speed indications. Such sensors add extra cost and complexity to wheel slip control systems, and often reduce system reliability.

Other known systems for reducing locomotive wheel slip use traction motor currents to determine if wheel slip conditions occur, without the need for ground speed indicators. Typically, minimum and maximum currents are compared to threshold values and if wheel slip is detected, power to the motors is reduced to attempt to correct the slip. However, reapplication of power to the traction motors after power reduction can cause the wheels to slip again thus, reintroducing wheel slip and creating inefficient traction conditions. Some known systems reduce power to the traction motors drastically and reapply power very slowly. Although this technique generally does not reintroduce wheel slip, it is inefficient and does not optimize the load on the locomotive.

Still other known systems for reducing locomotive wheel slip provide a large fixed amount of power reduction once wheel slip is detected. Frequently, however, the amount of power need not be reduced so drastically in order to correct the slip, especially if the magnitude of the slip is not large. Such over-correction is thus, inefficient and fails to achieve maximum traction.

The present invention is directed to a system for detecting and correcting wheel slip without requiring speed sensors or indicators, and serves to reapply power to the traction motors after wheel slip has been detected and reduced without re-introducing wheel slip.

SUMMARY OF THE INVENTION

One of the primary objects of the present invention is to provide a novel locomotive traction enhancing system which overcomes the drawbacks of prior known systems by providing for wheel slip detection, correction, and power reapplication without monitoring ground speed or wheel speed.

A more particular object of the present invention is to provide a locomotive traction enhancing method and apparatus that utilizes traction motor current to determine wheel slip conditions and to perform traction enhancement calculations.

Another object of the present invention is to provide a novel locomotive traction enhancing method and apparatus that is retrofitable to existing locomotives and can be readily interconnected to existing locomotive control modules.

Another object of the present invention is to provide a novel locomotive traction enhancing system which finds particular application with locomotives having six axles.

In carrying out the present invention, a locomotive traction enhancing system is provided which utilizes computer controlled algorithms that require no ground or wheel speed indication. All inputs to the system are based on current and voltage measurements from each of the traction motors. Once wheel slip is detected, power to the traction motors is reduced in proportion to the magnitude of the wheel slip. Thus, power is reduced only by the amount necessary to correct wheel slip. After power reduction, power is reapplied to the traction motors using a controlled S-shaped curve which gradually reapplies power so as not to reintroduce wheel slip. Thus, the magnitude of the power reduction needed to correct the subsequent wheel slip is smaller than the prior power reduction.

The traction enhancing system detects and corrects wheel slip and enhances wheel traction in a railroad locomotive having a plurality of wheel pairs for engaging a pair of rails and a traction motor operatively associated with each wheel pair. The locomotive includes an electrical source responsive to an applied level of excitation and is operatively coupled to the traction motors for controlling the power applied thereto. The traction enhancing system includes a plurality of current measuring devices adapted to measure current drawn by each traction motor, and a plurality of voltage measuring devices adapted to measure a voltage of each traction motor. A computer receives the current and voltage measurements and is configured to detect wheel slip between the wheel pairs and the rails by calculating a change in the current and voltage measured over a predetermined period of time. The change in current and voltage over time is compared to predetermined values and a reduction factor representative of the severity of the wheel slip is determined. The computer then reduces the level of excitation to the electrical source by an amount proportional to the reduction factor to eliminate the wheel slip. Power is then reapplied to the electrical source according to an S-shaped curve so that wheel slip does not reoccur.

A feature of the traction enhancing system in accordance with the present invention lies in its relatively low cost. The system is retrofitable to existing locomotive systems and quickly and easily replaces existing wheel slip modules by simple box replacement. Sensors attach to existing locomotive wiring without the need to splice or cut existing wires. This increases system reliability and reduces installation cost. Product cost is also reduced since there is substantially no replacement of existing equipment, except for the existing wheel slip control unit. System cost is further reduced and system reliability increased by eliminating the need for speed detecting devices.

Further objects, features and advantages of the present invention, together with its organization and manner of operation, will become apparent from the following detailed description taken in conjunction with the accompanying drawings wherein like reference numerals designate like elements throughout the several views.

DETAILED DESCRIPTION

Figure 1:
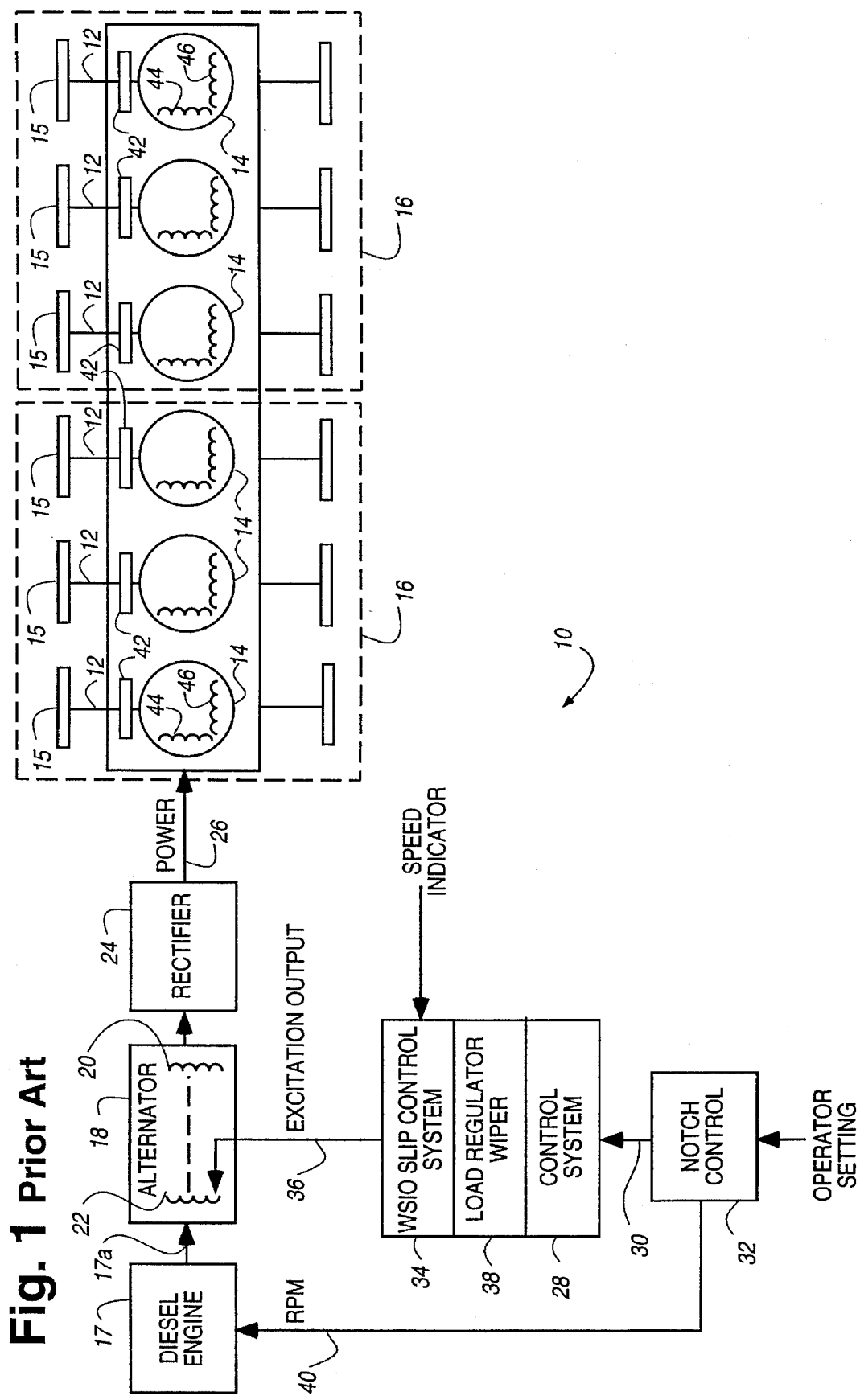
FIG. 1 is a block diagram illustrating the major operating and functional components of a known railroad locomotive.

Referring now to the drawings, FIG. 1 in particular shows a block diagram of a railroad locomotive of known design that is indicated generally as 10. The locomotive system may comprise a General Motors Locomotive Model SD40-2 having six axles 12 and six DC traction motors 14, with each traction motor being coupled to a separate axle through a suitable gearing arrangement as is known. Each axle 12 has a pair of wheels 15 affixed thereto so that the wheels of each pair or set engage laterally opposite rails of a conventional railroad track. As will become apparent, the present invention may also be employed with other suitable locomotives such as General Motors Locomotive Models SD38-2 and SD39-2d. The locomotive axles 12 are conventionally arranged between opposite ends of the locomotive into individual "trucks", as shown in dash lines 16. Thus, a six axle locomotive will have three axles 12 per truck 16, whereas a four axle locomotive would have two axles per truck. For purposes of illustration only, six axle locomotives are shown in the drawings and referred to in the following description.

A diesel engine 17 is coupled to an AC generator 18 and supplies mechanical energy to rotate the generator. The generator 18 includes a fixed stator winding 20 and a rotating field winding 22. The rotational speed of a drive shaft 17a of the diesel engine 17 turning the field winding 22 in combination with the current supplied to the field winding determine the power output generated across the stator windings 20. The generator 18 may be of known design such as a Model AR-10 AC generator manufactured by General Motors Corporation (GMC). The term "AC generator" is used interchangeably with the terms "generator" or "alternator", as described hereinafter. The AC generator 18 produces an AC output which is received by a high power full-wave bridge rectifier circuit 24. The rectifier 24 converts the AC power from the generator 18 into DC power by inverting the negative half wave portions of the power waveform, as is known. The DC output 26 of the rectifier 24 supplies DC power to the traction motors 12 which, in turn, rotate the axles 12.

A control system 28 receives a speed setting indication 30 from a notch controller 32 that is under direct control of an operator. The control system 28 is an integral part of the existing locomotive system manufactured by General Motors and is well known in the art. The control system 28 may also include a slip control unit 34, such as a WS-10 slip controller of known design. The slip control unit 34 governs the power output of the generator 18 by controlling an excitation signal 36 supplied to the field winding 22 of the generator 18, and is under direct control of the control system 28. The excitation output signal 36 has a voltage level of between 0 and 50 volts DC. When an excitation of 0 volts is applied to the field winding 22, no power is produced by the generator 18, thus, no power is supplied to the traction motors 14. When an excitation of 50 volts DC is applied to the field winding 22, maximum power is supplied to the traction motors 14 by the generator 18. The excitation output signal 36 governed by the slip control system 34 is supplied to the slip control unit 34 by a load regulator wiper 38 and is under direct control of the control system 28. The notch controller 32 also controls the generator output by varying the rate of rotation of the diesel engine 17 and, hence, the field winding 22 via an RPM signal 40.

Each traction motor 14 may comprise a Model D77 traction motor as commercially available from GMC, although other traction motors, such as a GMC D78 or D86 may also be used. As aforedescribed, the traction motors 14 are coupled to the axles 12 through suitable mechanical transfer mechanisms, such as gear box 42, as is known.

Six axle locomotives, known as SD-type locomotives, allow two modes of operation of the traction motors 14: series-parallel operation and parallel operation. In series-parallel operation, two traction motors 14 are connected in series while remaining in parallel with the other set(s) of series motors. In parallel operation, all traction motors 14 are arranged in parallel. Four axle type locomotives, known as GP-type locomotives, allow only parallel operation in which all four traction motors are arranged in parallel.

Each traction motor 14 has a field winding 44 and an armature winding 46. The field winding 44 and the armature winding 46 may be connected in series through an external motor connection (not shown) so that both receive power from the same source, as is known. However, the winding connection of traction motor 14 is not limited to a series configuration and may be configured in other modes.

Figure 2:
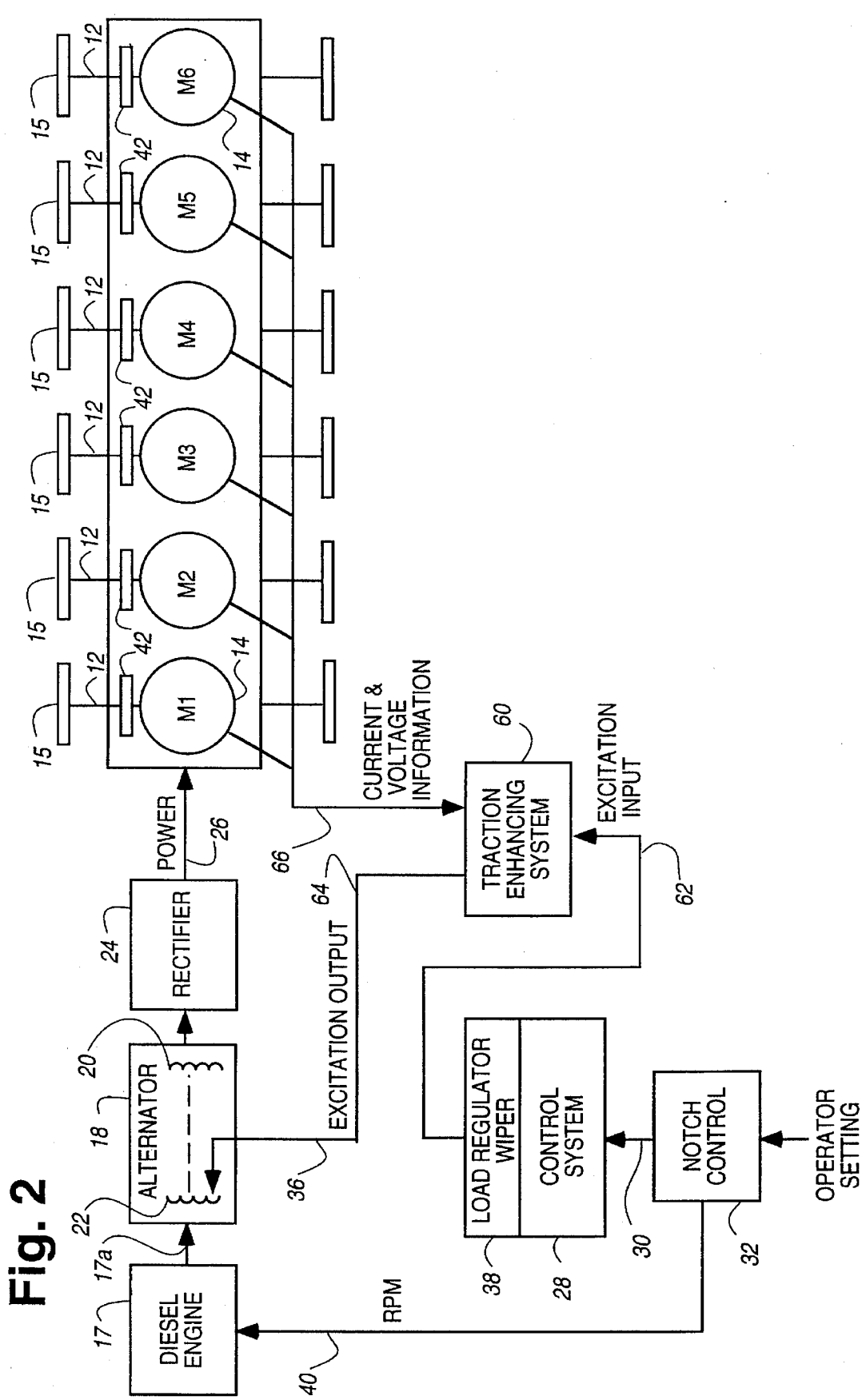
FIG. 2 is a block diagram illustrating the major components of a railroad locomotive similar to FIG. 1 but incorporating a traction enhancing system in accordance with the present invention.

FIG. 2 illustrates in block diagram format the locomotive system of FIG. 1 but employing a traction enhancing system, shown generally as 60, in accordance with a preferred embodiment of the present invention. The traction enhancing system 60 is shown interposed between the existing control system 28 and the AC generator 18. The traction enhancing system 60 replaces the slip control system (e.g. the WS-10 slip control system 34) employed in the locomotive illustrated diagrammatically in FIG. 1. It essentially intercepts an existing excitation signal or power reference line 62 produced by the load regulator wiper 38, and controls an excitation output line 64 to correct for wheel slip and to enhance traction. Thus, the traction enhancing system may also be referred to as an excitation controller. Note, that a significant feature of the traction enhancing system 60 is that it intercepts the existing excitation line 62 rather that attempting to simply vary its output while the excitation line is connected to the load regulator wiper 38. Other known systems may not intercept the existing excitation line 62, but rather, modify its output through load dropping resistors (not shown) or other means. This is inefficient and costly due to the fixed correction characteristics of the load dropping resistors. Installation of the traction enhancing system 60 is substantially "invisible" as it replaces an existing wheel slip unit (34 of FIG. 1) while interfacing to existing inputs and outputs. The traction enhancing system 60 receives voltage and current information from each traction motor 14, as indicated by a line labeled 66.

Figure 3:
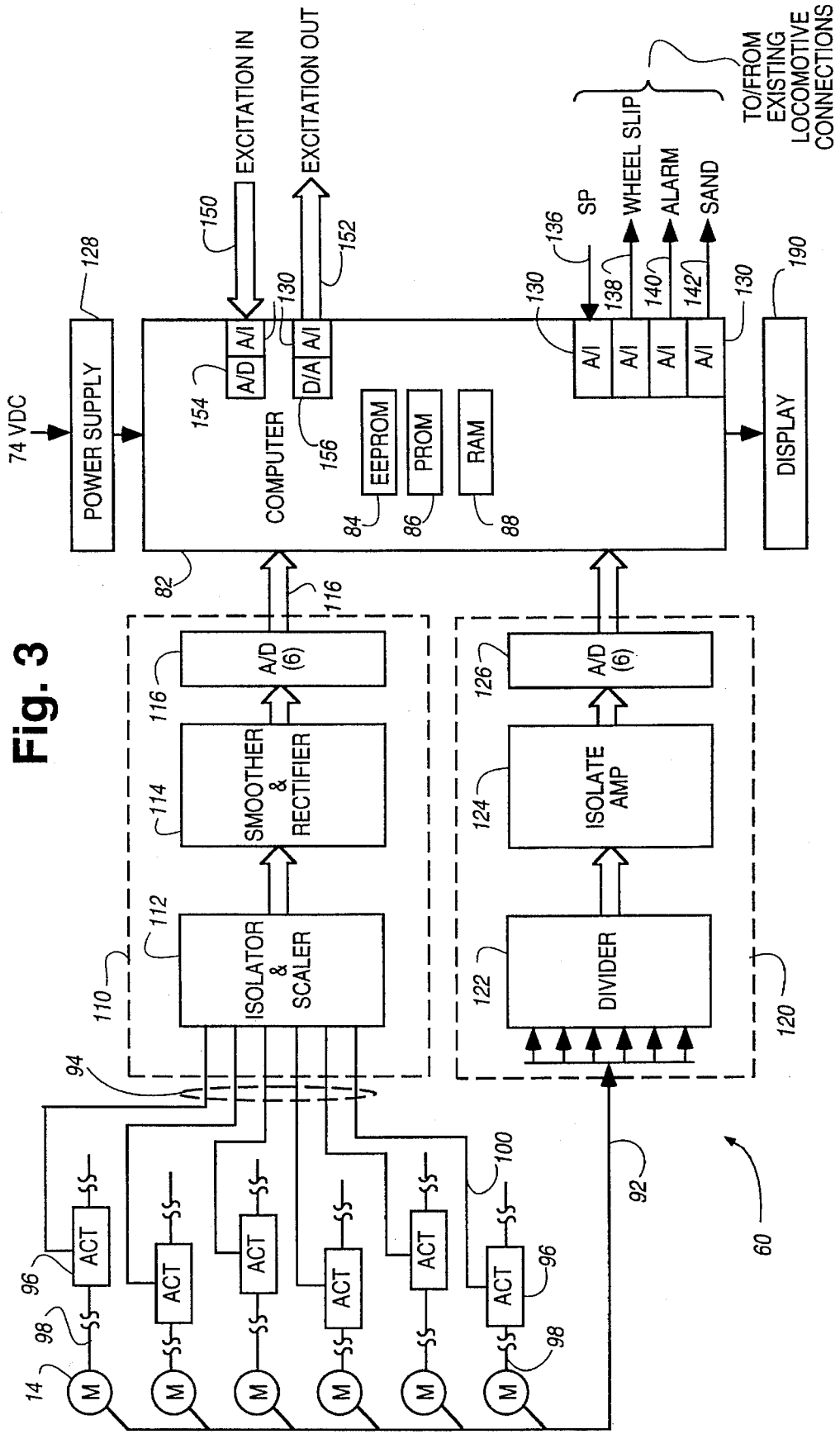
FIG. 3 is a functional block diagram of one embodiment of the traction enhancing system illustrated in block diagram format in FIG. 2.

Referring now to FIG. 3, a functional block diagram of one embodiment of the traction enhancing system 60 of FIG. 2 is shown. The traction enhancing system 60 is easily retrofitable to existing locomotives since substantially no rewiring of the locomotive is required.

The traction enhancing system 60 includes a microprocessor unit 82, such as a Motorola 68HC11 microprocessor, electrically erasable programmable read only memory (EEPROM) 84, programmable read only memory (PROM) 86, random access memory (RAM) 88, and an LCD display 90. Such devices are well known in the art and may be included in a board manufactured by Mosaic Industries and known as a "QEDII" board.

The traction enhancing system 60 receives voltage 92 and current 94 information from each traction motor 14 of the locomotive. Inductive armature current transductors (ACT) 96 attach to the existing power wiring 98 of each motor to provide an indication of the current flowing in the armature of each traction motor 14. No cable splicing is required since the ACTs 96 are attached around existing power wiring 98. The existing power wiring 98 of each traction motor 14 may be easily detached from its power source and the ACT 96 may be slipped over the wire. The power wiring 98 is then reattached to its power source to allow for inexpensive and rapid installation of the ACTs 96. The ACTs 96 provide the output current signals 94 which indicate the amount of current flowing in the power wiring 98. The ACTs 96 may measure current in a range from between 0 to about 2000 amperes, as is well known in the art. The ACTs 96 may be a Model 6L6 P/M 77014664 current transductor, manufactured by G&G Lotronics Inc. However, any suitable current measuring device may be used.

Each signal 94 output from the ACTs 96 are conditioned by a current conditioning circuit, shown in dash lines as 110. The current conditioning circuit 110 includes an isolation transformer/scaler circuit 112, a smoother/rectifier circuit 114, and an analog to digital converter bank 116 (six converters in one bank). Each signal 94 is received by one of the analog to digital converters in the bank 116. The isolation transformer/scaler 112 receives the current signals 94 from the ACTs 96 where such current signals are AC current signals proportional to the DC current measured in the power wiring 98. The isolation transformer/scaler 112 magnetically isolates the current signals 94 received to eliminate transients and to prevent damage to the traction control system 60 in case of accidental failure of high voltage components in the locomotive system, as is well known in the art. The current signals 94 are also scaled or increased by a factor of about ten since the isolation transformer/scaler 112 also functions as a step-up transformer. The output of the isolation transformer/scaler 112 is an analog signal between approximately 0 and 5 volts AC, which may represent a current of about between 0 to 2000 amperes (DC) in the power wiring 98 of each traction motor 14.

The output of the isolation transformer/scaler 112 is then rectified and smoothed by the smoother/rectifier circuit 114 to produce an analog output signal having a digital voltage range. The output of the smoother/rectifier current 114 is an analog DC signal between about 0 and 5 volts. The analog output of the smoother/rectifier current 114 is then converted to a digital signal by the analog to digital converter 116, as is well known in the art.

Voltage signals 92 from each traction motor 14 are provided and conditioned by a voltage conditioning circuit, shown in dash lines as 120. The voltage conditioning circuit 120 includes a divider circuit 122, an isolation amplifier 124, and an analog to digital converter bank 126 (six converters in one bank). Wires attached to the armature not shown) of each traction motor 14 provide a high voltage signal ranging from about 0 to 1500 volts to the divider circuit 122. The divider circuit 122 reduces the magnitude of the voltage by a factor of about three-hundred, such that the output of the divider 122 is an analog signal in the range of about 0 to 5 volts. The output of the divider circuit 122 is received by the isolation amplifier 124 which magnetically isolates the signals. Next, the analog output of the isolation amplifier 124 is converted to a digital signal by the analog to digital converter bank 126, as is well known. Again, each voltage signal 92 is received by one of the analog to digital converters in the bank 126.

Power is supplied to all components in the traction enhancing system 60 by a power supply 128 which converts 74 volts DC supplied by the locomotive into suitable voltages for use by the various components of the traction enhancing system. Connection to the output of the power supply is not explicitly shown in the drawing.

The microprocessor 82 receives digitized information from the two analog to digital converter banks 116 and 126 and bases traction control processes and calculations on these current and voltage measurements. The microprocessor 82 also receives signals from various existing locomotive systems. Since the locomotive uses a 74 volt DC reference for all input and output signals, all signals entering and exiting the traction control system 60 must be converted to suitable voltage levels. For each signal entering the traction control system 60, an amplifier/isolator 130 is provided to convert to the 0 to 74 volt DC locomotive input into a suitable digital level. For example, suitable digital voltage levels may be +5 volts, +15 volts, and −15 volts.

For each signal exiting and the traction control system 60, the amplifier/isolator 130 provides conversion to the 74 VDC locomotive standard. Each amplifier/isolator 130 module also optically isolates each of the signals.

A signal labeled SP (136) is received by the microprocessor 82 through the amplifier/isolator module 130 and indicates whether the traction motors 14 are arranged in a series-parallel or parallel configuration. The microprocessor 82 may vary the calculation process and certain constants depending upon the configuration indication.

The traction enhancing system 60 provides various output signals to the locomotive system such as wheel slip 138, alarm 140, and sand 142. These signals are also conditioned by the amplifier/isolator modules 130. The wheel slip signal 138 illuminates an existing light or other suitable indicator when wheel slip is detected so that the user can monitor locomotive conditions. The alarm signal 140 provides an audio indication to the user when the traction enhancing system 60 detects error conditions, such as pinion slip motor failure, wheel lock, open motor, and the like. To increase traction between the rails and the wheels, an onboard locomotive sand dispensing system may be activated by the sand signal 142. This causes sand to be dispensed between the rails and the wheels.

Two excitation signals, labeled excitation input 150 and excitation output 152 are the primary control signals of the traction enhancement system 60. Each signal 150 and 152 is coupled to the microprocessor 82 through the amplifier/isolator module 130 such that compatibility with the existing locomotive voltage reference is maintained. The excitation input signal 150 is further coupled to an analog to digital converter 154 while the excitation output signal 152 is coupled to an digital to analog converter 156. The excitation input signal 150 is the primary excitation line supplied by the existing locomotive control system 28 of FIG. 2. The traction enhancement system 60 essentially intercepts or commandeers the excitation input signal 150 and adjusts the signal to provide slip control and traction enhancement. The excitation output signal 152, under control of the microprocessor 82, is coupled to the AC generator 18 of FIG. 2 and may vary from 0 to 50 volts. Thus, the traction enhancing system may be known as an excitation controller. The excitation output signal 152 varies from about 0 to 50 volts DC to control the AC generator output power, thus, providing full control over the traction motors 14. It may be easily seen that the traction enhancement system 60 is a cost-efficient system for providing wheel slip detection and traction enhancement since it interfaces with existing locomotive systems without the need for time-consuming and complicated rewiring or component replacement. Essentially, the traction enhancement system "breaks" the main excitation line and asserts control.

Figure 4A:
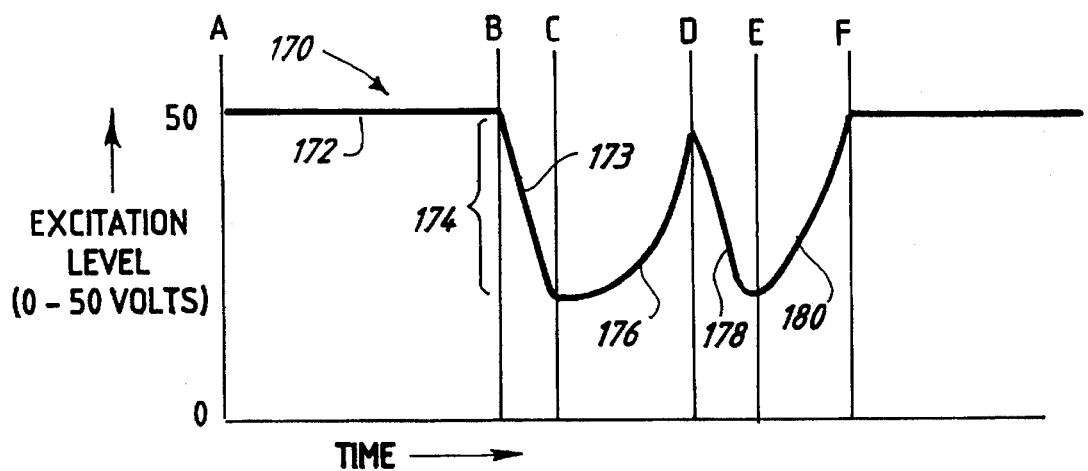
FIG. 4a is a graph depicting an excitation signal of a known slip control system.

Referring now to FIG. 4a, a graphical depiction of an excitation signal 170 of a known slip control unit is shown. The excitation signal 170 may represent the excitation signal sent to the AC generator 18 by the slip control unit 34 of FIG. 1. The signal 170 is divided into six segments delineated by letters A through F, respectively. The vertical axis represents the level of excitation, from 0 to a maximum value of about 50 volts. The horizontal axis represents time.

The segment from A to B, labeled 172, represents the excitation level when the traction motors are under full power and no slip is in progress. At time B, a wheel slip occurs and the known wheel slip unit reduces power to eliminate the wheel slip, as indicated from time B to time C, labeled 173, and is known as a down-spike 174. Often, known systems simply reduce power by a large fixed amount, even if such a large reduction in power is not required to correct the wheel slip. This is particularly inefficient.

During time C to time D, shown as 176, the known wheel slip unit reapplies power to bring the excitation level back to full power. However, reapplication of power may not be optimal and known wheel slip units (e.g, the WS-10 system) may cause wheel slip to reoccur, as illustrated at time D. Accordingly, from time D to time E, shown as 178, the known wheel slip unit again reduces power to eliminate the wheel slip. From time E to F, shown as 180, the known system reapplies power so as to achieve full power at time F, shown as 182. The above-described reduction in power followed by reapplication and further wheel slip may occur multiple times and is highly inefficient and potentially costly. Often, known systems simply reduce the sharpness of the reapplication of power so that slip is not reintroduced. However, this is also highly inefficient and may prevent the locomotive from reaching and maintaining optimal speed within the shortest period of time.

During the segments where power is reapplied 176 and 180, power is not maximized, thus, traction is not maximized. Maximum traction is achieved by applying the highest level of excitation possible while keeping the excitation level just under the point where wheel slip is introduced. In practice, a very slight amount of controlled wheel slip is permitted. This is called wheel creep and represents a condition where maximum traction is achieved, even though some wheel slip exists. Known wheel slip units may not be able to maintain a controlled level of wheel creep. Known systems either apply too little power, hence underpower the locomotive, or apply too power, and create wheel slip.

Figure 4B:
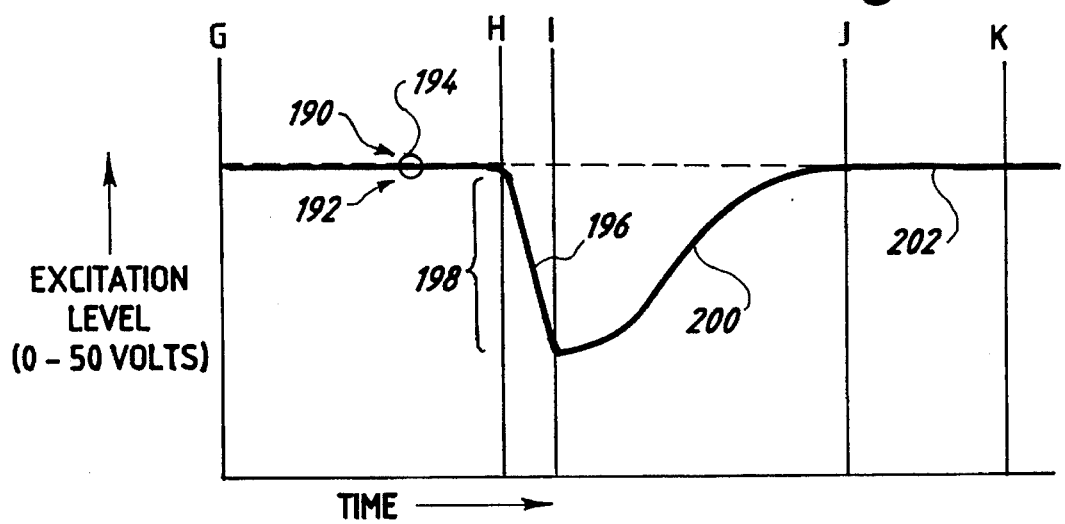
FIGS. 4b and 4c are graphical depictions of an excitation signal as controlled according to one embodiment of a traction enhancing system in accordance with the present invention.

Referring now to FIGS. 2 and 4b, FIG. 4b is a graphical depiction of an excitation signal as controlled according to the traction enhancing system 60 of FIG. 2. Two excitation signals 190 and 192 are illustrated. The excitation signal shown as a dash line 190 represents the desired level of excitation provided by the existing control system 28 into the traction enhancing system 60, and is designated "excitation input". The excitation signal shown as a solid line 192 represents the excitation output of the traction enhancing system 60. The excitation lines are divided into six segments delineated by letters G through J, respectively. The vertical axis represents the level of excitation, from 0 to a maximum of about 50 volts (full power). The horizontal axis represents time.

The segment from G to H, labeled 194, represents the excitation level when the traction motors are under full power and no slip is detected. During this period of time the two lines 190 and 192 are coincident. Accordingly, the traction enhancing system 60 supplies the excitation output signal 192 which is equal to the excitation input signal 190 requested by the existing control system 28 of FIG. 2.

At time H, a wheel slip occurs and the traction enhancing system 60 reduces power to eliminate the wheel slip, as indicated from time H to time I and labeled 196. This is known as a down-spike 198. The amount of power reduction or down-spike 198 is not an arbitrary or fixed quantity, rather, it is proportional to the magnitude of the measured wheel slip. Thus, if a small amount of wheel slip is detected, power is only slightly reduced. Conversely, if a large amount of wheel slip is detected, power is reduced greatly. Accordingly, the down-spike 198 represents the minimum amount of power reduction needed to correct the detected wheel slip.

During time I to time J, labeled 200, the traction enhancing system 60 reapplies power to bring the excitation level back up to full power. Power is reapplied using an S-shaped curve 200 which is essentially an exponential curve followed by an inverse exponential curve. The magnitude of excitation supplied is calculated to maximize traction by applying the proper level of excitation to created a sustained and controlled wheel creep. In other words, a maximum level of power applied is just under the level that would induce detrimental wheel slip.

At time J, the excitation output from the traction enhancing system 60 equals the excitation input requested by the existing control system 28, and the two excitation levels 190 and 192 are coincident from time J to time K as shown by segment 202.

Figure 4C:
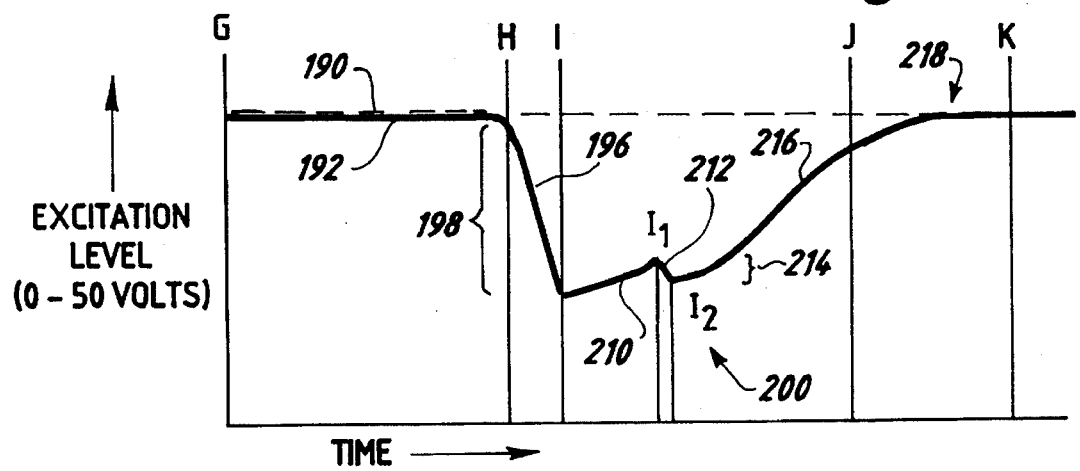

Referring now to FIGS. 2 and 4c, FIG. 4c is identical to FIG. 4b during time G through I. From time I to time I1, indicated by 210, the traction enhancing system 60 reapplies power to bring the excitation level back up to full power. Power is reapplied using the S-shaped curve 200 as described above with reference to FIG. 4b. However, as may happen given various external conditions such as slippery rails and steep terrain, reapplication of power may cause wheel slip to reoccur, as shown from time I1 to I2 and indicated as 212. The amount of wheel slip beginning at time I1 caused by the reapplication of power may be less that the amount of the initial wheel slip that occurred beginning at time H. Again, a down-spike 214 (reduction of power needed to correct the wheel slip) is applied that is proportional to the magnitude of the measured wheel slip.

After time I2 the traction enhancing system 60 again reapplies power to bring the excitation level back up to full power using the S-shaped curve, as indicated in a segment from I2 to K, and labeled 216. Segment 210 and segment 216 both follow the shape of an S-shaped curve 200. Note, that multiple wheel slips may cause a delay in achieving maximum power such that the excitation output signal 192 is not coincident with the excitation input signal 190 until some time within the segment labeled J to K, shown as 218.

Figure 5:
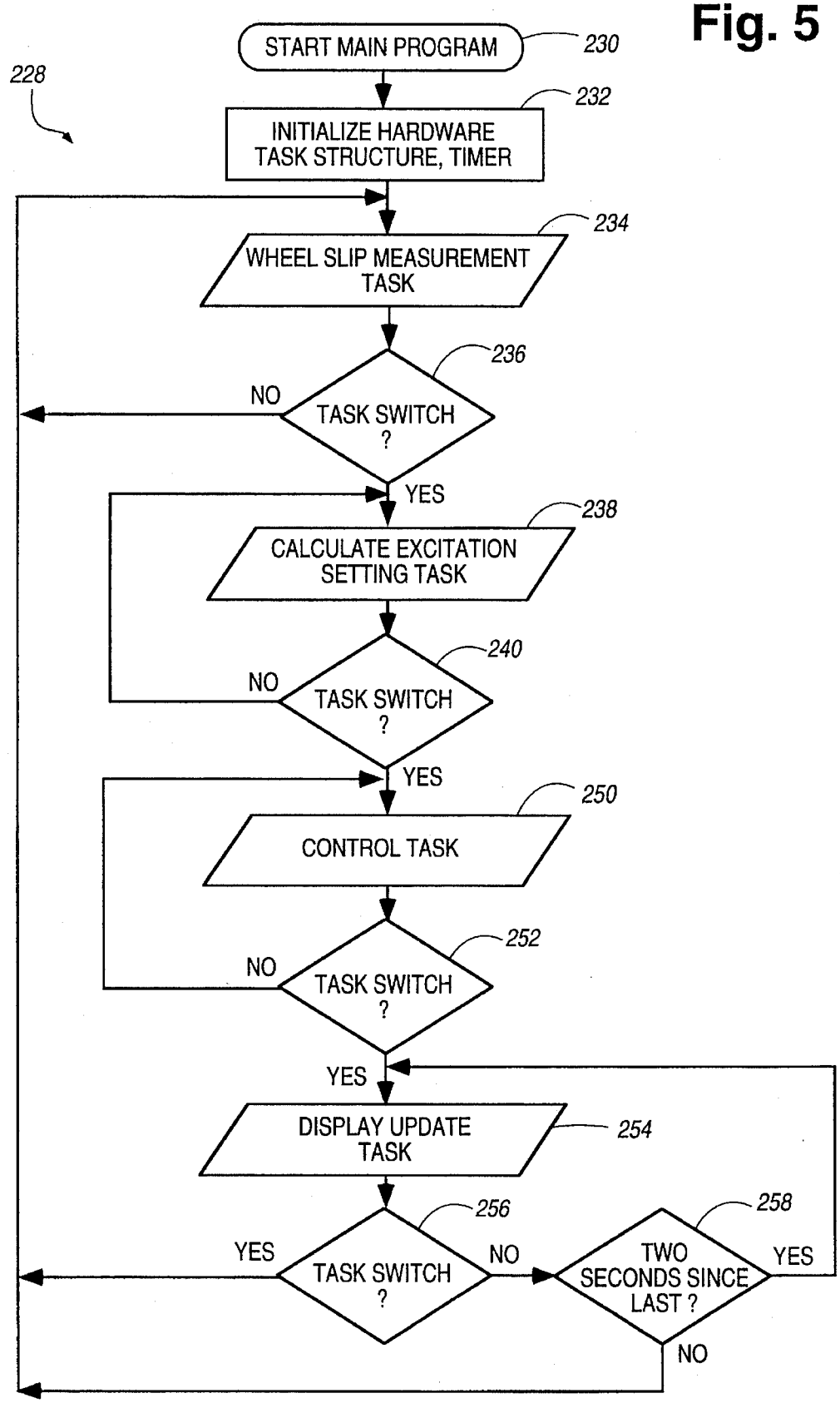
FIG. 5 is a flowchart illustrating one embodiment of a task management program according to the present invention.

Referring now to FIG. 5, a high-level flowchart of a task management program 228 is shown. Please refer to the Appendix for a complete listing of the computer software written in Forth. The task management program 228 begins as indicated by step 230. Next, various portion of hardware are initialized, a task sequence is determined, and time slice values are established, as illustrated in step 232. Note, that the program is not a truly linear procedure as it might appear from the flowchart. The task management program is a multi-tasking system where a period of time, known as a time slice, is devoted to each individual task. After a particular task has executed for a predetermined amount of time, the task exits even if it has not been fully completed, and another task is initiated. After various tasks have been executed for the predetermined time slice, the interrupted task is eventually reentered at the last exit point to continue execution. In this way, time critical functions are periodically and timely executed so that real time control is achieved. Of course, in certain portions of a task where a process must be completed, interruption of the task may be precluded for a predetermined period of time. Additionally, certain areas of a task may be bypassed so that they are executed only once.

Next, as indicated in step 234, a wheel slip measurement task 234 is called to measure traction motor current and voltage values for use in subsequent tasks. After voltage and current data has been collected and various values calculated, if the task is not due to be switched, (e.g. the amount of time devoted to this task has not yet expired) process control branches back to step 234, as shown in a "no" branch of step 236 to continue wheel slip measurements. The wheel slip measurement task 234 may be executed repeatedly but limited by the duration of the time slice.

If the time slice has expired, as indicated by the "yes" branch of step 236, a calculate excitation setting task is called as illustrated by step 238. In step 238, a new level of excitation is calculated given a current level of excitation and an excitation reduction value, as will be described in greater detail below. Next, if the task 238 is not due to be switched, (e.g. the amount of time devoted to this task has not yet expired) process control branches back to step 238, as shown in a "no" branch of step 240 to continue executing the calculate excitation setting task. The calculate excitation setting task 238 may be executed, for example, forty times per second.

Next, as indicated by step 250, a control task is called. The control task 250 calculates a down-spike, or a reduction factor based on the current and voltage values measured in step 234. The reduction factor (down-spike) is the amount of reduction applied to the current excitation level to reduce the level of power to the traction motors so that wheel slip is corrected. The value of the reduction factor (down-spike) is equal to zero if no wheel slip is detected.

The control task 250 also reapplies excitation in a controlled manner after the wheel slip has been corrected such that the level of excitation is raised from the down-spike level to a full power level. If the control task 250 is not due to be switched, process control branches back to step 250, as shown in a "no" branch of step 252 to continue executing the control task. The control task 250 may be executed, for example, forty times per second.

If the time slice has expired, as indicated by the "yes" branch of step 252, a display update task is called as illustrated by step 254. The display update task 254 displays information to the user such as motor voltage, motor current values, excitation values, adhesion values, wheel slip values, motor protection values, self test data, locomotive weight and identification number, and the like. Next, if the display update task 254 is not due to be switched, as indicated by a "no" branch of step 256, a timer is checked to determine whether two seconds has elapsed since the last display update task execution as indicated by step 258. Process control branches back to step 254, as shown in a "yes" branch of step 258 to continue the display update task if the display has not been updated within the last two seconds.

If two seconds has not elapsed since the last execution of the display update task 254, as indicated by the "no" branch of step 258, process control branches to step 234 (beginning of the task management program 228).

Figure 6A:
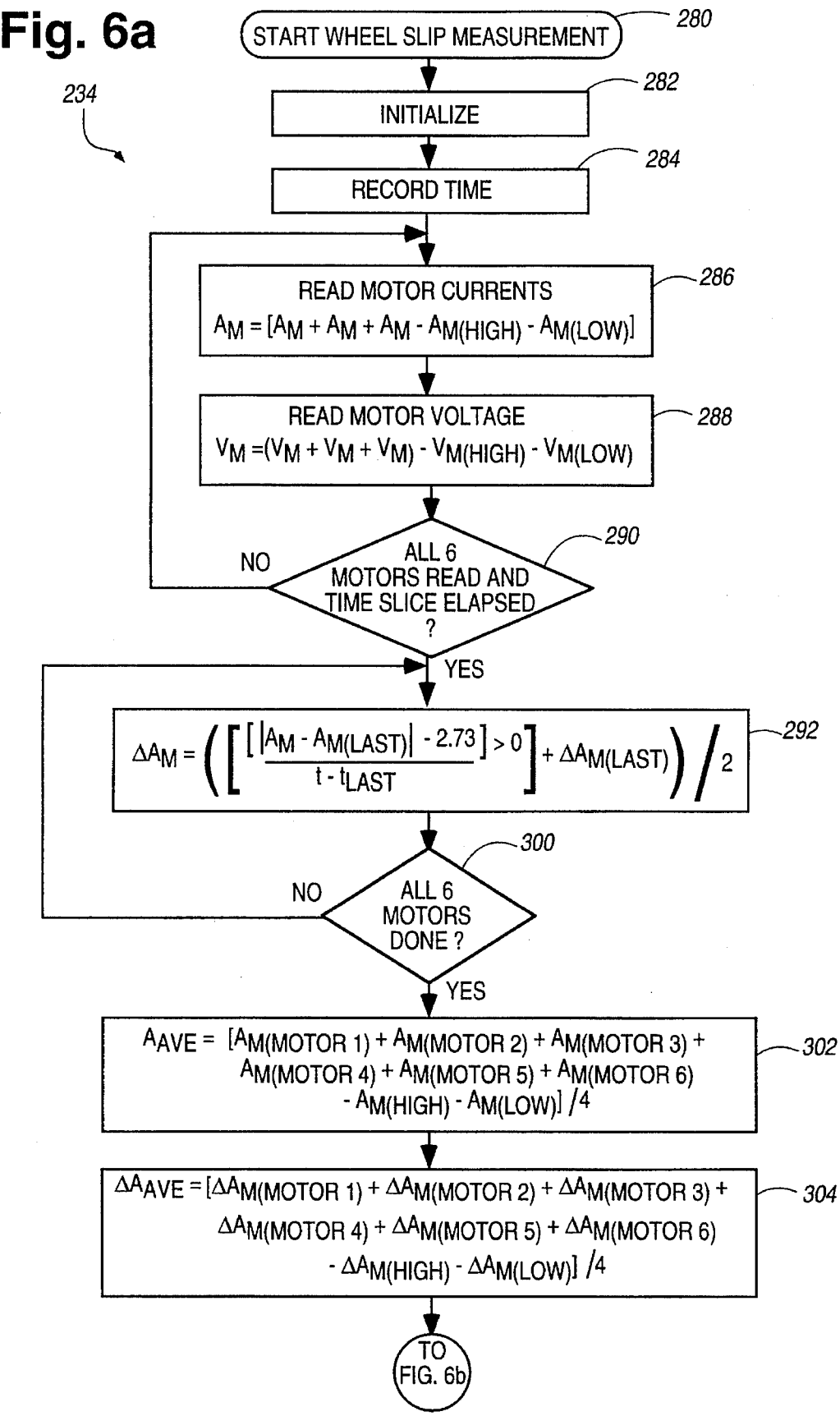
FIG. 6a and 6b are flowcharts illustrating one embodiment of a wheel slip measurement task in accordance with the present invention.
Figure 6B:
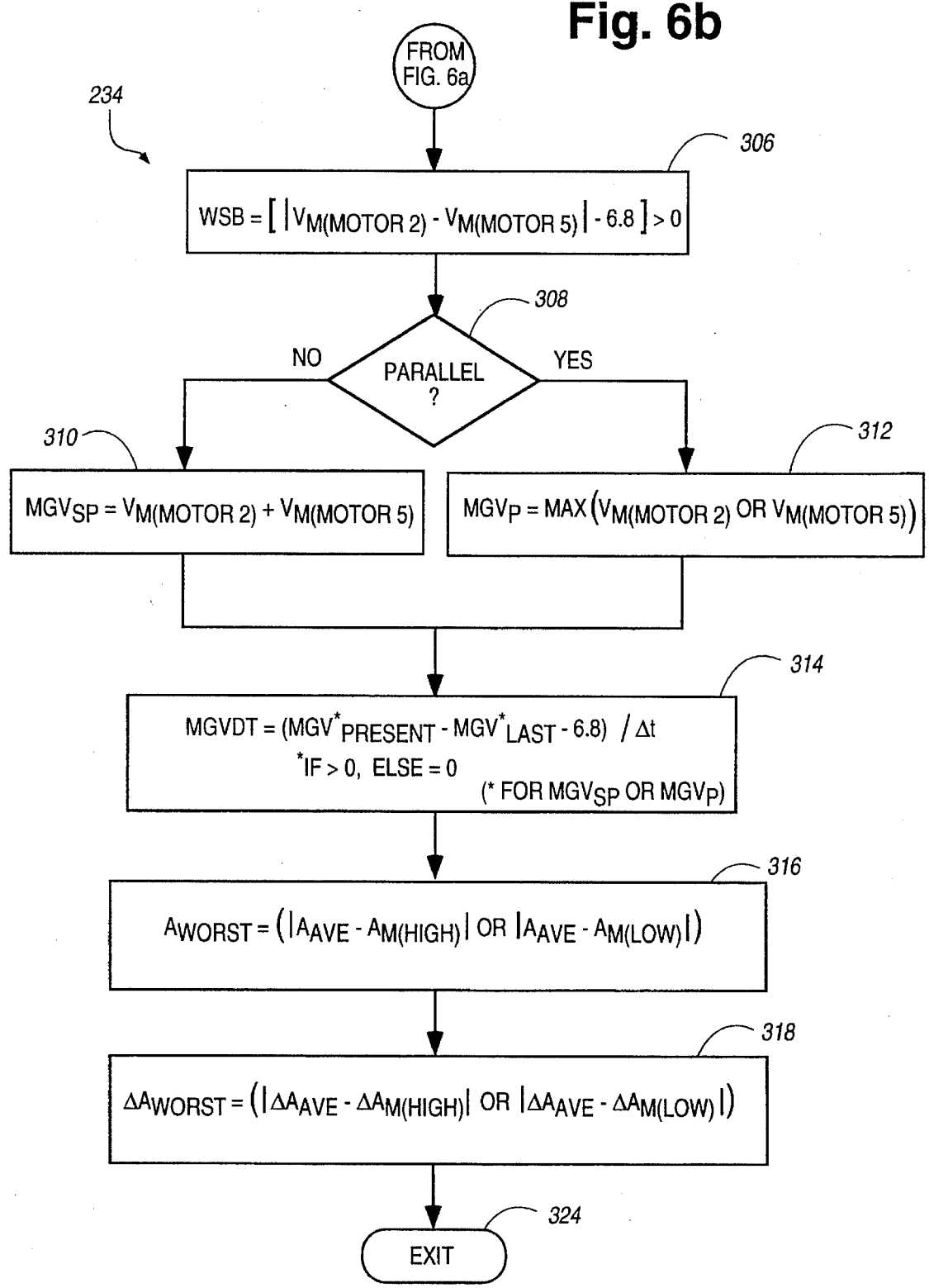

Referring now to FIG. 6a and 6b, one embodiment of the wheel slip measurement task 234 of FIG. 5 is shown. The wheel slip measurement task begins as shown in step 280. Next, various memory locations, variables, and the like, are initialized as shown in step 282. The time of entry into the task is recorded, as illustrated in step 284, and will correspond to the time of the voltage and current data measurements described hereinafter.

Next, as indicated in step 286, a motor current ($A_M$) is read. Three successive readings of the motor current ($A_M$) are measured for one particular motor and the high and low values ($A_{M(HIGH)}$, $A_{M(LOW)}$) are discarded. The median value of the motor current is saved as a representative current of the motor current for a particular motor.

As indicated in step 288, a motor voltage ($V_M$) is then read. Three successive values of the motor voltage ($V_M$) are measured for one particular motor and the high and low values ($V_{M(HIGH)}$, $V_{M(LOW)}$) are discarded. The median value of the motor voltage is saved as a representation voltage of the motor voltage for a particular motor.

The above current and voltage measurements are performed for each of the six traction motors. If the motor current value ($A_M$) and the motor voltage value ($V_M$) for all six motors have not been measured, as shown by the "no" branch of step 290, process control branches back to step 286 to continue measuring motor current and motor voltage values for all of the motors. If all of the voltage and current values have been measured and the time slice has expired, as illustrated by the "yes" branch of step 290, step 292 is executed. As shown in step 292 the difference in motor current over time, or delta motor current ($\Delta A_M$) is computed. The absolute value of the difference in motor currents between the present reading ($A_M$) and the previous reading ($A_{M(LAST)}$) divided by the elapsed time between measurements (t-$t_{LAST}$) is found. The elapsed time between measurements (t-$t_{LAST}$) is equal to the difference in time between two successive entries into the wheel slip measurement task 234.

An error factor representing a one bit analog to digital conversion error (e.g. 2.73) is subtracted from the absolute value result. The result is not permitted to become negative. The quantity is then "smoothed" to obtain a rolling average by averaging the present delta motor current value ($\Delta A_M$) with the previously calculated delta motor current value ($\Delta A_{M(LAST)}$). The previously calculated delta motor current value ($\Delta A_{M(LAST)}$) was calculated during a prior iteration of this task.

If the delta motor current values ($\Delta A_M$) for all six motors have not been calculated, as shown by the "no" branch of step 300 process control branches back to step 292 to continue calculating delta motor current values ($\Delta A_M$) for all of the motors.

After the delta motor current values ($\Delta A_M$) have been calculated for each of the six motors, as shown by the "yes" branch of step 300, an instantaneous average motor current ($A_{AVE}$) is calculated as shown in step 302. The motor current values ($A_M$) are summed for each of the six motors and the highest and lowest values ($A_{M(HIGH)}$, $A_{M(LOW)}$) are discarded. The result is then averaged over the remaining four motors to obtain the instantaneous average motor current for the system ($A_{AVE}$).

Next, an average delta motor current value ($\Delta A_{AVE}$) is calculated, as illustrated in step 304. This calculation is similar to the calculation of the average motor current ($A_{AVE}$) of step 302. The delta motor current ($\Delta A_M$) values determined in step 304 are summed for each of the six motors and the highest and lowest values ($\Delta A_{M(HIGH)}$, $\Delta A_{M(LOW)}$) are discarded. The result is then averaged over the remaining four motors to obtain the average delta motor current value over time ($\Delta A_{AVE}$) for the system.

A wheel slip bridge value (WSB) is now calculated, as illustrated in step 306. The wheel slip bridge value (WSB) is the absolute value of the difference between the voltage measurements ($V_M$) of the second motor (motor 2) and the fifth motor (motor 5) minus an error factor. The error factor represents a one bit analog to digital conversion error (e.g. 6.8). The wheel slip bridge value (WSB) is set equal to zero if the result of the calculation is less than zero. The second and fifth motors are chosen since they are physically between two other motors (motor 1 and motor 3, motor 4 and motor 6) and thus, are deemed to be representative of each locomotive truck. When the traction motors are arranged in a series-parallel configuration, all three axles on one truck may slip while the axles of the other truck do not slip.

Current measurements alone may not be able to detect this condition because the current flowing through two motors connected in series is essentially constant. This occurs because the current flow through the non-slipping motor increases to account for the loss in current through the slipping motor due to the increased work load of the non-slipping motor. The current flowing through each motor of a motor connected in series remains constant, however, the current flowing through the other two sets of series motors may vary. However, the motors experiencing slip have a higher voltage across the windings since those motors rotate at an increased rate.

Thus, if a difference in motor voltage between each truck (e.g. between motor 2 and motor 5) is greater than a predetermined value, a slip condition may be detected. Since in this situation, all axles of one truck perform similarly, only one axle or traction motor of each truck need be inspected. Accordingly, the voltage of the second motor (in the first truck) is selected while the voltage of the fifth motor (in the second truck) is selected.

Next, a configuration variable is inspected to determine whether the traction motors are configured in a parallel or series parallel arrangement, as shown in step 308. (the configuration variable is derived from the "SP" signal of FIG. 3). If a series-parallel arrangement is indicated, as illustrated by the "no" branch of step 308, a main generator voltage ($MGV_{SP}$) for the series-parallel configuration is calculated, as shown in step 310. The main generator voltage ($MGV_{SP}$) for the series-parallel configuration is the sum of the motor voltages ($V_M$) of motor two ($V_{M(MOTOR\ 2)}$) and motor five ($V_{M(MOTOR\ 5)}$). If a parallel arrangement is indicated, as illustrated in the "yes" branch of step 308, a main generator voltage ($MGV_P$) for the parallel configuration is calculated as shown in step 312. The main generator voltage ($MGV_P$) for the parallel configuration is the greater of the motor voltages between motor two and motor five.

After the main generator voltages ($MGV_{SP}$, $MGV_P$) are calculated for either the series-parallel or parallel configuration, a delta main generator voltage (MGVDT) is calculated, as indicated in step 314. The delta main generator voltage (MGVDT) is calculated as the difference between the present and the previous main generator voltage values ($MGV_{SP}$ or $MGV_P$) divided by the time difference between present voltage measurement and the last voltage measurement. An error factor is subtracted from the difference and represents a one bit analog to digital conversion error (e.g. 6.8). The delta main generator voltage value (MGVDT) is set equal to zero if the result of the calculation is less than zero.

Next, a worst case deviation of motor current ($A_{WORST}$) is calculated, as indicated in step 316. The worst case deviation of motor current ($A_{WORST}$) is the absolute value of the difference between the average motor current ($A_{AVE}$) and the most extreme motor current, that is, either the highest ($A_{M(HIGH)}$) or the lowest ($A_{M(LOW)}$) motor current value as previously measured. The absolute value quantity having the greatest magnitude is used.

Next, a worst case deviation of delta motor current ($\Delta A_{WORST}$) is calculated, as indicated in step 318. This calculation is similar to the calculation of the worst case deviation of motor current ($A_{WORST}$) of step 316. The worst case deviation of delta motor current ($\Delta A_{WORST}$) is the absolute value of the difference between the average delta motor current ($\Delta A_{AVE}$) and the most extreme delta motor current (($\Delta A_{M(HIGH)}$) or ($\Delta A_{M(LOW)}$)) that is, either the highest or the lowest delta motor current value as found previously. The absolute value calculation having the greatest magnitude is used. As illustrated in step 324, the wheel slip measurement task 234 exits if the time slice has elapsed.

Figure 7:
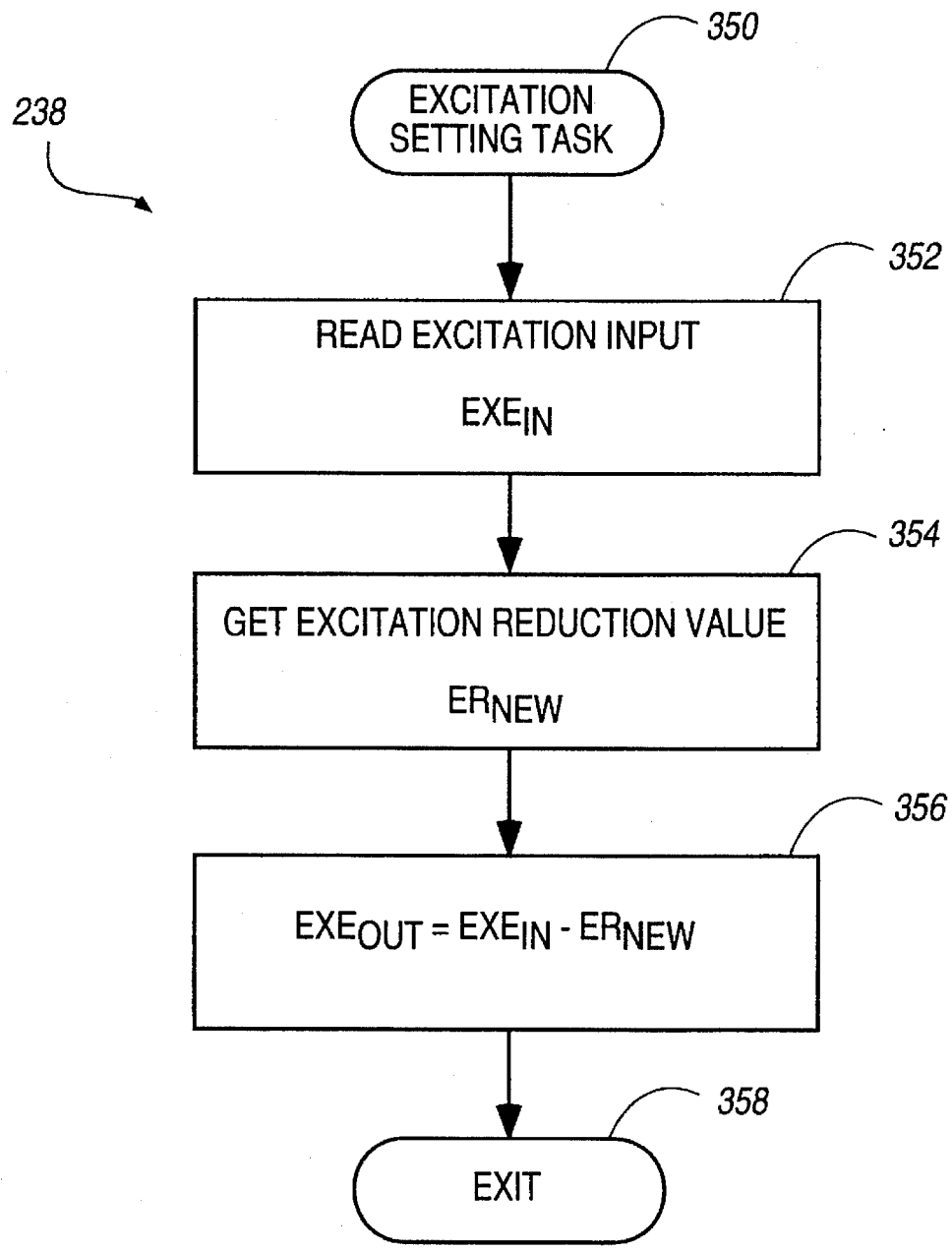
FIG. 7 is a flowchart illustrating one embodiment of an excitation setting task in accordance with the present invention.

Referring now to FIG. 7, the excitation setting task 238 of FIG. 5 is illustrated. The excitation setting task 238 begins as shown in step 350. The excitation setting task 238 reads a current level of excitation ($EXE_{IN}$) that is currently applied to the AC generator and hence, to the traction motors, as shown in step 352. This value ($EXE_{IN}$) represents the level of excitation supplied to the traction enhancing system from the existing locomotive control system.

Next, as indicated in step 354, the value of a new excitation reducer ($ER_{NEW}$) is read. Note, that this value is not calculated in this task but rather, is calculated in a subsequent task (calculated in the control task). If this is the initial entry into the excitation setting task 238, the value of the new excitation reducer ($ER_{NEW}$) will not yet have been calculated, and an initial value of zero is used.

A current level of excitation output ($EXE_{OUT}$) is determined, as illustrated in step 356, by subtracting the value of the new excitation reducer ($ER_{NEW}$) from the value of the excitation input ($EXE_{IN}$). Note that the current level of excitation output ($EXE_{OUT}$) does not represent a changed level of output until the value of the new excitation reducer ($ER_{NEW}$) has been calculated by the control task 250 and made available to the excitation setting task 238. The new level of excitation ($EXE_{OUT}$) is then output to the AC generator to modify its power output. Next, as illustrated in step 358, the excitation setting task 238 exits.

Figure 8:
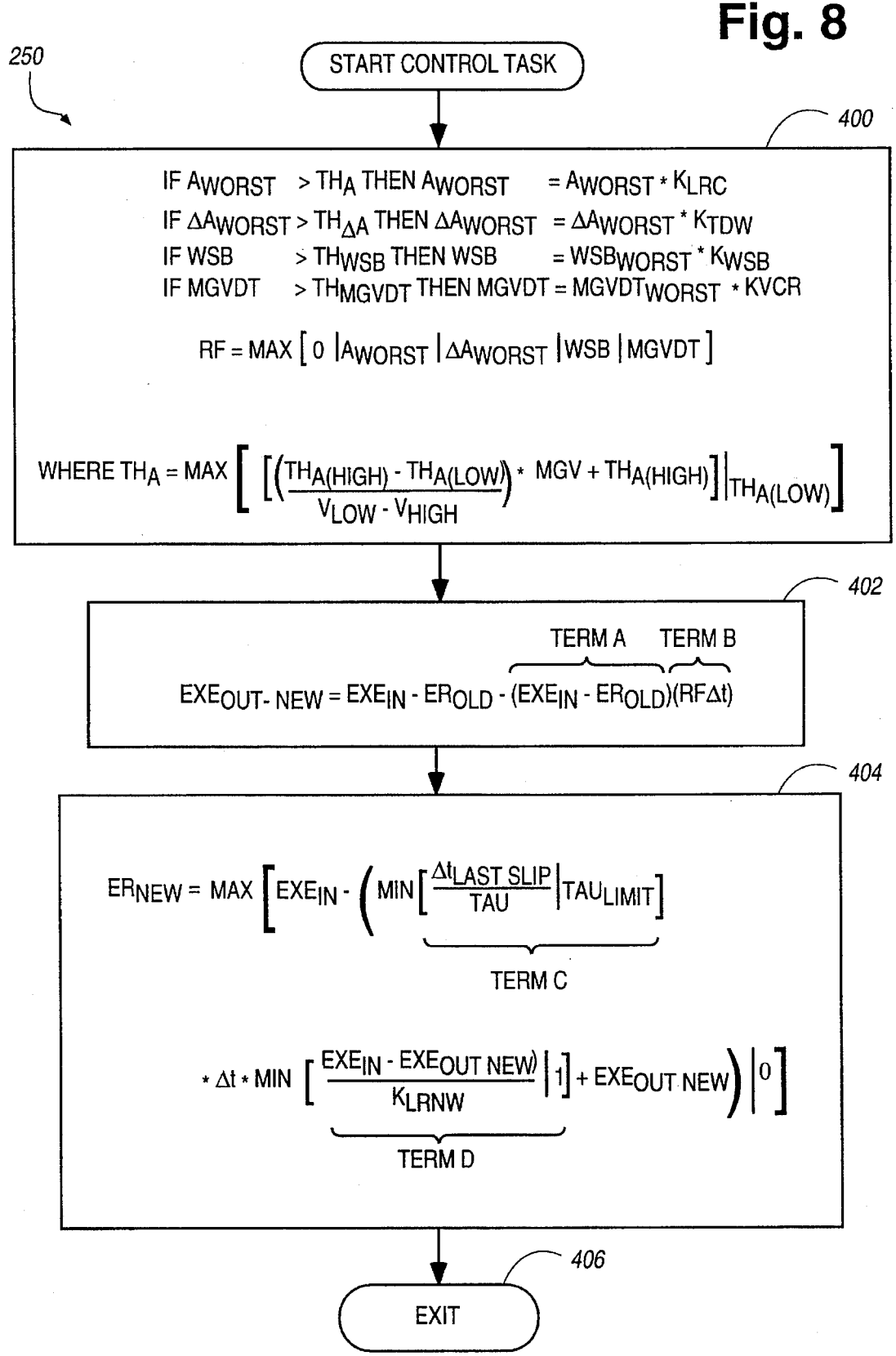
FIG. 8 is a flowchart illustrating one embodiment of a control task according to the present invention.

Referring now to FIG. 8, one embodiment of the control task 250 is shown. FIG. 8 illustrates the calculation of a reduction factor (RF) proportional to the amount of wheel slip detected. The value (RF) will be used indirectly to reduce the power to the traction motors to eliminate the wheel slip, as will be described hereinafter.

Next, as shown in step 400, the values of $A_{WORST}$, $\Delta A_{WORST}$, WSB, and MGVDT are compared to threshold values $TH_A$, $TH_{\Delta A}$, $TH_{WSB}$, and $TH_{MGVDT}$, respectively. If each calculated value is greater than the associated threshold value, the calculated value is multiplied by the constant $K_{LRC}$, $K_{TDW}$, $K_{WSB}$, and $K_{VCR}$, respectively. If the value of $A_{WORST}$, $\Delta A_{WORST}$, WSB, and MGVDT is not greater than the associated threshold value, the calculated values remain unmodified.

Referring now to the calculation of $A_{WORSRT}$ in step 400, the LRC constant ($K_{LRC}$) for example, may be equal to about 0.0008. The worst case deviation of motor current ($A_{WORST}$) represents one particular motor of the six motors whose current consumption most deviates from the average of all six motors. Note, that the two extreme motor current values ($A_{M(HIGH)}$, $A_{M(LOW)}$) do not adversely influence the outcome of the calculation since the average motor current value ($A_{AVE}$) was calculated as the average of four motors, with the highest and lowest motor current values ($A_{M(HIGH)}$, $A_{M(LOW)}$) already discarded.

The current threshold value ($TH_A$) is calculated as follows: a lowest expected current threshold ($TH_{A(Low)}$) is subtracted from a highest expected current threshold ($TH_{A(HIGH)}$). The result is divided by a difference between a lowest expected voltage ($V_{LOW}$) and a highest expected voltage ($V_{HIGH}$). For example, $V_{LOW}$ may be equal to 0 and $V_{HIGH}$ may be equal to 1200 while $TH_{A(low)}$ may be equal to 50 and $TH_{A(HIGH)}$ may be equal to 150. The above quotient is multiplied by the main generator voltage (MGV—for the appropriate motor configuration) and is added to the highest expected current threshold ($TH_{A(HIGH)}$) value. The greater of the above calculation or the lowest expected current threshold ($TH_{A(LOW)}$) value is used as the current threshold value ($TH_A$).

Essentially, the current threshold value ($TH_A$) is used to calculation a position on a sloped line where the horizontal axis represents traction motor volts and the vertical axis represents traction motor current. The locomotive may travel at a low speed or a high speed causing the relationship between current and voltage measured at the traction motors to vary. At a low speed, the traction motors draw high current but at a relatively low voltage. At a high speed, the traction motors draw low current but at a relatively high voltage. Thus, depending on the speed of the locomotive, the current threshold value ($TH_A$) is allowed to vary or "slide" to account for the relationship between current and voltage at different locomotion speeds. In summary, the deviation of the current draw of one particular traction motor from the average current draw of all six motors ($A_{WORST}$) is compared to the current threshold ($TH_A$) which varies inversely depending on locomotive voltage.

The quotient portion of the above calculation for the current threshold value ($TH_A$) represents a "rise over run" division which yields a slope. Multiplication by the main generator voltage (MGV) fixes a position along the slope representative of the present traction motor voltage while addition of the highest expected current threshold ($TH_{A(HIGH)}$) acts as an offset. The final result of the current threshold ($TH_A$) calculation of step 352 yields the maximum of either the above calculation or the lowest expected current threshold ($TH_{A(LOW)}$).

Referring now to the calculation if $\Delta A_{WORST}$ in step 400, the TDW constant for example, may be equal to 0.00015. The delta threshold value ($TH\Delta_A$) for example, may be about equal to 65. The worst case deviation of delta motor current ($\Delta A_{WORST}$) represents one particular motor of the six motors whose current consumption over time most deviates from the average of all of the six motors over time. Note, that the one extreme delta motor current value (($\Delta A_{M(HIGH)}$) or ($\Delta A_{M(LOW)}$)) does not adversely influence the outcome of the result ($\Delta A_{(worst)}$) since the average delta motor current value ($\Delta A_{AVE}$) was calculated as the average of four motors, with the highest and lowest delta motor current value already discarded, as was illustrated in step 304 of FIG. 6a.

Referring now to the calculation of WSB in step 400, the predetermined WSB constant ($K_{WSB}$) for example, may be equal to 0.0006. The wheel slip bridge threshold value ($TH_{WSB}$) for example, may be equal to the value of 20.

Referring now to the calculation of MGVDT in step 400, the VCR constant ($K_{VCR}$) for example, may be equal to 0.8 and the threshold ($TH_{MGVDT}$) may be equal to 350. The MGVDT threshold value ($TH_{MGVDT}$) represents a change in voltage over time for the main generator output. If the delta main generator voltage value (MGVDT) is not greater than the threshold value ($TH_{MGVDT}$), the worst case delta main generator voltage value (MGVDT) remains unmodified.

Referring now to the calculation of the reduction factor (RF) in step 400, the reduction factor represents the magnitude or severity of the wheel slip. This value is subsequently used to apply a correction to the traction motors to eliminate the wheel slip. If the reduction factor (RF) is equal to zero, then no wheel slip was detected and no correction need be applied. The reduction factor (RF) is the maximum of the following: zero, the worst case deviation of motor current ($A_{WORST}$), the worst case deviation of delta motor current ($\Delta A_{WORST}$), the wheel slip bridge value (WSB), or the delta main generator voltage value (MGVDT).

To allow for meaningful comparison among the above four worst case values, each value is normalized and adjusted for relative importance. This was accomplished by using the factors $K_{LRC}$, $K_{TDW}$, $K_{WSB}$, and $K_{VCR}$, as described above. Since the value of the reduction factor (RF) is proportional to the magnitude of the wheel slip, a large amount of wheel slip results in a large reduction factor (RF) while a small amount of wheel slip results in a correspondingly small reduction factor value. Thus, the reduction factor (RF) when applied to the traction motors by the traction enhancing system reduces power by the minimum amount needed to eliminate wheel slip.

Referring now to steps 402 and 404, at this point, the current level of excitation output ($EXE_{OUT}$) is known, as determined by the excitation setting task 238 of FIG. 7. This represents the current level of excitation supplied to the AC generator by the traction enhancing system. The reduction factor (RF) is also known as was calculated above in step 400. Accordingly, the reduction factor (RF) must now be indirectly applied to the current level of excitation output ($EXE_{OUT}$) to eliminate wheel slip, if any.

As illustrated in step 402, a temporary value ($EXE_{OUT-NEW}$) representative of a new level of desired excitation output is determined. The new level of desired excitation output ($EXE_{OUT-NEW}$) is essentially a reduction in power necessary to correct wheel slip. Note that the control task 250 does not actually perform the modification of the excitation level applied to the AC generator. Rather, the control task 250 calculates the value to be applied to the AC generator by the excitation setting task 238 of FIG. 7.

As illustrated in step 402, the new level of desired excitation output ($EXE_{OUT-NEW}$) equals the excitation input $EXE_{IN}$ minus an old excitation reducer value ($ER_{OLD}$) minus the product of a first term (Term A) and a second term (Term B), as will be described below. The old excitation reducer value ($ER_{OLD}$) should not be confused with the reduction factor (RF) determined earlier in step 400. The reduction factor (RF) represents the magnitude of the wheel slip while the old excitation reduction ($ER_{OLD}$) value represents the last change in excitation.

The first term (Term A) is equal to the difference between the current excitation level ($EXE_{IN}$) and the old excitation reducer value ($ER_{OLD}$). The second term (Term B) is equal to the product of the reduction factor and a time difference ($\Delta t$). The time difference ($\Delta t$) represents the time between successive entries into the control task. The reduction factor (RF) is multiplied by the time difference ($\Delta t$) so that only a portion of the reduction factor has an effect on the excitation level for each iteration of the control task.

Next, as illustrated in step 404, a new excitation reducer value ($ER_{NEW}$) is calculated using the value of the new desired excitation output ($EXE_{OUT-NEW}$). The new excitation reducer value ($ER_{NEW}$) is the quantity that actually affects the level of applied excitation since it is applied to the AC generator in step 356 of the excitation setting task (238 of FIG. 7).

Note, however, that steps 402 and 404 are used for two related purposes. Both steps may modify the level of the new excitation reducer ($ER_{NEW}$) and hence, the level of excitation. First, the new excitation reducer ($ER_{NEW}$) value may represent a sharp reduction in power (down-spike) required to eliminate wheel slip. Second, after wheel slip has been eliminated, this same step 384, called subsequently may increase the level of excitation from the reduced down-spike level towards full power or full excitation. This is accomplished by successively decreasing the value of the new excitation reducer ($ER_{NEW}$) towards zero. Thus, if the reduction factor (RF) is zero (indicating no wheel slip) and if excitation is already at full power, the new excitation reducer value ($ER_{NEW}$) will equal the old excitation reducer value ($ER_{OLD}$) indicating that no change in the level of excitation is required.

Figure 9:
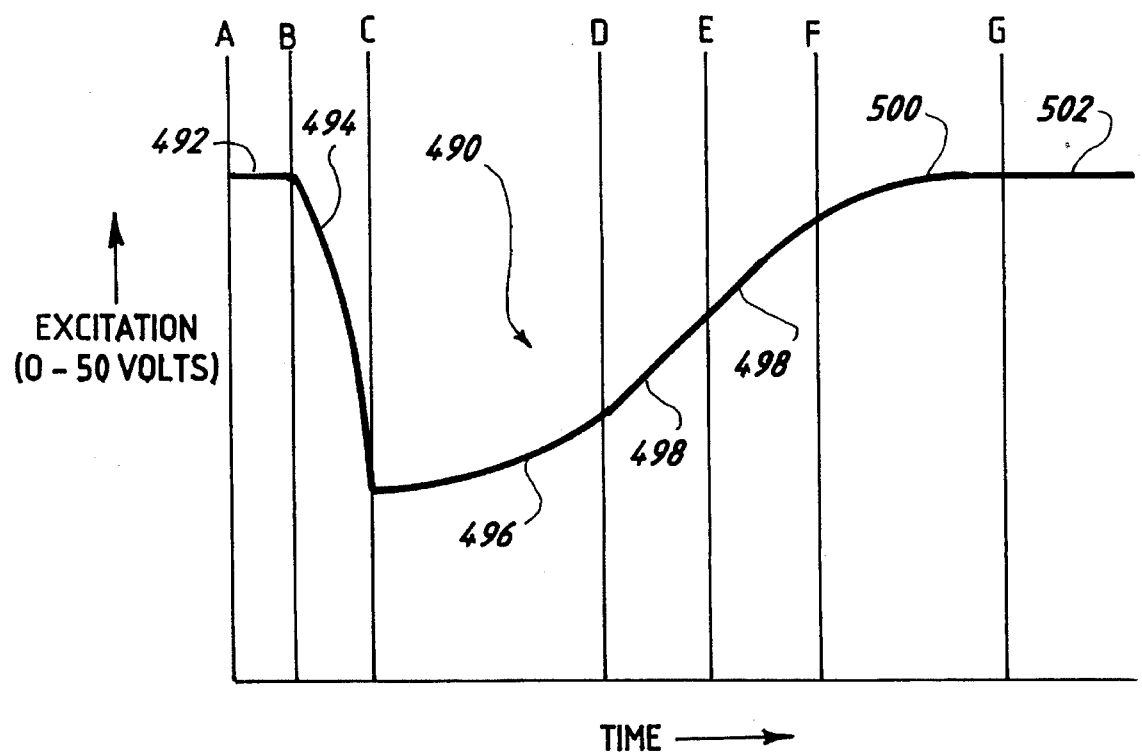
FIG. 9 is a graphical depiction of an S-shaped excitation signal produced according to one embodiment of the traction enhancing system of the present invention.

Step 404, as described hereinafter, illustrates reapplication of power or excitation after power was reduced to eliminate wheel slip. In subsequent iterations of the control task 250, steps 402 and 404 calculate the amount of excitation to apply to raise the excitation level to full power. Referring to FIGS. 8 and 9, FIG. 9 illustrates the S-shaped excitation signal 490 sent to the AC generator by the traction enhancing system 60. The curve 490 is divided into seven segments delineated by letters A through G, respectively. The vertical axis represents the level of excitation from 0 to a maximum of about 50 volts, which is full power. The horizontal axis represents time.

A segment from A to B, labeled 492, indicates maximum excitation. A segment from B to C, labeled 494, shows that the excitation level is sharply reduced to correct a wheel slip condition. A segment from C to D, labeled 496, represents a portion of the S-shaped curve 490 where reapplication of power is gradual. A segment from D to F, labeled 498, represents a portion of the S-shaped curve 490 where reapplication of power is sharp and fairly linear, and a segment from F to G, labeled 500 represents a portion of the S-shaped curve where reapplication of power approaches a maximum level of excitation, and is once again gradually. The segment beyond G, labeled 502, indicates that the level of excitation is at maximum, and represents the same condition as the segment from A to B (492).

The value of the new excitation reducer ($ER_{NEW}$) is calculated to slowly reapply power immediately after a wheel slip correction (segment B to C, 494). Over time, the excitation level is applied at a gradually increasing rate. (segment C to D, 496)

In accordance with the shape of the curve in segment C to D (496), a third term (Term C of step 404) is calculated as the minimum of the quantity of the change in time since the last slip occurred ($\Delta T_{last\ slip}$) divided by Tau, or the value of a constant (Tau$_{LIMIT}$), whichever is less. The value of Tau, for example may be about equal to 1.5 while the value of the constant (Tau$_{LIMIT}$) may be about equal to 1.1. or 2.0, depending upon whether the locomotive is accelerating or decelerating. A maximum value is established by using the constant (Tau$_{LIMIT}$).

If the time since the last wheel slip occurred ($\Delta T_{LAST\ SLIP}$) is small, indicating that a slip just occurred and has been corrected (segment B to C, 494), then the third term (Term A) will be similarly small since the time quantity ($\Delta T_{LAST\ SLIP}$) is small. This insures that reapplication of power is gradual (segment C to D, 496) immediately following the wheel slip correction so as to avoid reintroducing or causing further wheel slip. As the time since the last wheel slip ($\Delta T_{LAST\ SLIP}$) increases, the third term (Term C) will increase in magnitude. This represents an sharp increasing reapplication of power, as indicated by the segment D to F (498).

In accordance with the shape of the S-shaped curve in segment F to G (500), a forth term (Term D) is calculated as the minimum of the quantity of the current excitation input level (EXE$_{IN}$) and the new level of desired excitation output (EXE$_{OUT-NEW}$) divided by a constant (K$_{LRNW}$), or the value of one, whichever is less. The value of the constant (K$_{LRNW}$), for example, may be equal to the value of 20. The forth term (Term D) limits the steepness of the reapplication of power (during segment F to G (500)) as the level of excitation approaches the desired maximum level 502. As the level of excitement approaches full power the difference between the current excitation input level (EXE$_{IN}$) and the new level of desired excitation output (EXE$_{OUT-NEW}$) approaches zero.

The segment of the S-shaped curve illustrated by segment D to F (498) represents the greatest or sharpest reapplication of power and is least affected by the limiting terms (Term C and Term D). Thus, times which are fairly removed from both the prior wheel slip correction and reapplication of full power, (e.g. somewhere in the middle of the curve) display the sharpest increase in excitation reapplication.

The value of the new excitation reducer (ER$_{NEW}$) is calculated as the maximum of the current excitation input level (EXE$_{IN}$) minus the product the third term (Term A), the forth term (Term B), and a time between iterations of the control task ($\Delta t$), plus the new level of desired excitation output (EXE$_{OUT-NEW}$ of step 402), or zero, whichever is larger.

The third term (Term C) and the forth term (Term D) are multiplied by time between iterations of the control task ($\Delta t$) since the control task is iterative. In other words, it is repeated many times. Multiplication by the time between iterations ($\Delta t$) allows a fractional amount of excitation to be applied each time the control task is executed. The new level of desired excitation output (EXE$_{OUT-NEW}$) is added to the result of the above calculation to provide an incremental change to the level of excitation over the previous iteration.

Thus, the final result of the above calculation determines the value of the new excitation reducer (ER$_{NEW}$). This value (ER$_{NEW}$) is then utilized in step 356 of the excitation setting task (238 of FIG. 7) to perform the actual change in applied excitation. Note, that the excitation setting task (238 of FIG. 7) actually performs the adjustment to the level of excitation (EXE$_{OUT}$) applied to the AC generator, and hence, to the traction motors. Once the new excitation reducer (ER$_{NEW}$) value has been calculated, as illustrated in step 404, the control task exits as indicated in step 406 leaving the calculated value ER$_{NEW}$ to be processed by the excitation setting task 238 of FIG. 7.

The control task 250 may be performed, for example, every twenty-five milliseconds, or forty times per second to provide an accurate and timely indication and correction of wheel slip and to reapply excitation to increase the level of excitation to pre-wheel slip levels, if possible.

Although, all of the above described wheel slip detection, wheel slip correction, and reapplication of excitation calculations are directed towards wheel slip during locomotive acceleration, the identical calculations and methods are also used during locomotive deceleration, such as when the locomotive applies braking. The traction enhancement system performs the same functions but in a reverse manner since the sign or polarity of certain calculated values will be opposite.

A specific embodiment of the locomotive traction enhancing system according to the present invention has been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. A traction enhancing system for eliminating wheel slip and enhancing wheel traction in a railroad locomotive having a plurality of wheel pairs for engaging a pair of rails, a traction motor operatively associated with each wheel pair, an electrical source responsive to an applied level of electrical excitation and operatively coupled to the traction motors for controlling the power applied to the traction motors, said traction enhancing system comprising:

a plurality of current measuring devices adapted to measure a current drawn by each traction motor;

a plurality of voltage measuring devices adapted to measure a voltage of each traction motor;

a computer for receiving the current and voltage measurements, said computer adapted to detect wheel slip between the wheel pairs and the rails by calculating a change in the current and voltage measured over a predetermined period of time and comparing the current and voltage changes to predetermined values;

said computer calculating a reduction factor and saving the reduction factor in a memory of the computer, the reduction factor corresponding to the change in the current and voltage over the predetermined period of time and representative of the magnitude of the wheel slip;

said computer reducing the applied level of electrical excitation to the electrical source by an amount proportional to said reduction factor to eliminate the wheel slip; and said computer reapplying a level of electrical excitation to the electrical source according to an S-shaped curve so that wheel slip does not reoccur, said S-shaped curve having a first segment such that the level of electrical excitation reapplied is gradually increased, said S-shaped curve having a second segment following the first segment such that the level of electrical excitation reapplied is sharply increased, and said S-shaped curve having a third segment following the second segment such that the level of electrical excitation reapplied is gradually increased until the level of excitation attains a maximum value.

2. A traction enhancing system for eliminating wheel slip and enhancing wheel traction in a railroad locomotive having a plurality of wheel pairs adapted to engage a pair of rails, a traction motor operatively associated with each wheel pair, an electrical source responsive to an applied level of electrical excitation and operatively coupled to the traction motors for controlling the power applied thereto, said traction enhancing system comprising:

means for detecting wheel slip between the wheel pairs and the rails and for creating an indicator representative of the severity of the wheel slip;

means for reducing the level of electrical excitation to the electrical source by an amount proportional to the indicator to eliminate the wheel slip;

means for reapplying a level of electrical excitation to the electrical source according to an S-shaped curve so that wheel slip does not reoccur; and said S-shaped curve having a first segment such that the level of electrical excitation reapplied is gradually increased, said S-shaped curve having a second segment following the first segment such that the level of electrical excitation reapplied is sharply increased, and said S-shaped curve having a third segment following the second segment such that the level of electrical excitation reapplied is gradually increased until the level of electrical excitation attains a maximum value.

3. A method for eliminating wheel slip and enhancing wheel traction in a railroad locomotive having a plurality of wheel pairs adapted to engage a pair of rails, a traction motor operatively associated with each wheel pair, an electrical source operatively coupled to the traction motors for controlling the power applied thereto, and an excitation controller for applying a level of electrical excitation to the electrical source for varying the power applied to the traction motors, said method comprising the steps of:

detecting wheel slip between the wheel pairs and the rails and creating an indicator representative of the severity of the wheel slip;

reducing the level of electrical excitation applied to the electrical source by an amount proportional to the indicator to eliminate the wheel slip;

reapplying a level of electrical excitation to the electrical source according to an S-shaped curve so that wheel slip does not reoccur; and said S-shaped curve having a first segment such that the level of electrical excitation reapplied is gradually increased, said S-shaped curve having a second segment following the first segment such that the level of electrical excitation reapplied is sharply increased, and said S-shaped curve having a third segment following the second segment such that the level of electrical excitation reapplied is gradually increased until the level of electrical excitation attains a maximum value.

4. The method according to claim 3 wherein the step of creating the indicator representative of the wheel slip includes the steps of:

measuring a current drawn by each of the plurality of traction motors, at a first time and at a second time;

measuring a voltage of at least two the plurality of traction motors, at a third time and at a forth time;

calculating a difference in the current measured at the first and the second time, for each traction motor;

calculating a difference in the voltage measured at the third and the forth time, for at least two of the plurality of traction motors;

declaring a wheel slip condition if the difference in the current is greater than a first predetermined value; and declaring a wheel slip condition if the difference in the voltage is greater than a second predetermined value.

5. The method according to claim 4 wherein the at least two of the plurality of traction motors are separated by two adjacent traction motors.

6. The method according to claim 3 wherein the step of reapplying a level of electrical excitation according to the S-shaped curve is performed using the formulas:

$$EXE_{OUT\text{-}NEW} = EXE_{IN} \cdot ER_{OLD} - (EXE_{IN} \cdot ER_{OLD}) \times (RF \Delta T)$$

and $$ER_{NEW} = \text{MAX}\left[ EXE_{IN} - \left( \text{MIN}\left[ \frac{\Delta t_{LASTSLIP}}{Tau} \mid Tau_{LIMIT} \right] \times \Delta T \times \text{MIN}\left[ \frac{EXE_{IN} - EXE_{OUT\text{-}NEW}}{K_{LRNW}} \mid 1 \right] + EXE_{OUT\text{-}NEW} \right) \mid 0 \right]$$

where $ER_{NEW}$ is a present change in electrical excitation reduction, $ER_{OLD}$ is a previous change in electrical excitation reduction, $EXE_{IN}$ is a level of electrical excitation input, $\Delta t_{LASTSLIP}$ is the time since a last wheel slip, $\Delta t$ is a time between calculation iterations, Tau is about 1.5, $Tau_{LIMIT}$ is about between 1.1 and 2.0, $K_{LRNW}$ is about 20, and RF is the magnitude of the wheel slip.

* * * * *